(12) United States Patent
Lynch et al.

(10) Patent No.: US 12,400,588 B2
(45) Date of Patent: Aug. 26, 2025

(54) ORGANIC LIGHT EMITTING DIODE DISPLAY HAVING PHOTODIODES

(71) Applicant: Apple Inc., Cupertino, CA (US)

(72) Inventors: Stephen Brian Lynch, Portola Valley, CA (US); Paul Stephen Drzaic, Morgan Hill, CA (US); Benjamin Mark Rappoport, Santa Barbara, CA (US); Fletcher R. Rothkopf, Los Altos, CA (US); John Patrick Ternus, Los Altos Hills, CA (US); Scott A. Myers, Saratoga, CA (US)

( * ) Notice: Subject to any disclaimer, the term of this patent is extended or adjusted under 35 U.S.C. 154(b) by 176 days.

(21) Appl. No.: 16/909,519

(22) Filed: Jun. 23, 2020

(65) Prior Publication Data

US 2020/0320926 A1 Oct. 8, 2020

Related U.S. Application Data

(63) Continuation of application No. 16/105,812, filed on Aug. 20, 2018, now Pat. No. 10,713,998, which is a continuation of application No. 15/619,358, filed on Jun. 9, 2017, now Pat. No. 10,056,029, which is a continuation of application No. 14/746,602, filed on
(Continued)

(51) Int. Cl.
*G09G 3/3208* (2016.01)
*G06F 3/041* (2006.01)
*G06F 3/042* (2006.01)

(52) U.S. Cl.
CPC ......... *G09G 3/3208* (2013.01); *G06F 3/0412* (2013.01); *G06F 3/0421* (2013.01); *G09G 2320/0233* (2013.01); *G09G 2320/0242* (2013.01); *G09G 2320/029* (2013.01); *G09G 2320/043* (2013.01); *G09G 2320/045* (2013.01); *G09G 2320/0626* (2013.01);
(Continued)

(58) Field of Classification Search
CPC .. G09G 3/3208; G09G 3/3648; G09G 3/2011; G09G 5/10; G09G 5/02; G06F 3/0412; G06F 3/0421; G06F 3/042; G06F 12/0842; H01L 27/3269
See application file for complete search history.

(56) References Cited

U.S. PATENT DOCUMENTS 6,975,008 B2 12/2005 Cok
7,026,597 B2 4/2006 Cok
(Continued)

*Primary Examiner* — Fred Tzeng
(74) *Attorney, Agent, or Firm* — Treyz Law Group, P.C.; Kendall P. Woodruff

(57) ABSTRACT

Systems, methods, and devices are provided in which photodetectors disposed throughout a display are used to control the display brightness. The photodetectors are to be used for ambient light sensing, proximity sensing, or to compensate for aging OLEDs. In some embodiments, photodiodes are fabricated with OLEDs during the TFT fabrication process. In some embodiments, the photodetectors may be disposed throughout the display in zones containing OLEDs. The photodetectors are used to control the display brightness and color for the OLEDs in areas around each photodetector based on ambient light, aging, and/or nearby objects. A controller makes driving strength adjustments to the OLEDs in each zone independent of other zones. Photodetectors disposed throughout the display may improve proximity sensing and provide additional functionality to the device.

19 Claims, 8 Drawing Sheets

Related U.S. Application Data

Jun. 22, 2015, now Pat. No. 9,679,513, which is a continuation of application No. 13/364,100, filed on Feb. 1, 2012, now Pat. No. 9,064,451.

(52) U.S. Cl.
CPC ............... *G09G 2320/0666* (2013.01); *G09G 2360/144* (2013.01); *G09G 2360/147* (2013.01)

(56) References Cited

U.S. PATENT DOCUMENTS

| | | |
|---|---|---|
| 7,271,378 B2 | 9/2007 | Cok |
| 7,469,060 B2 | 12/2008 | Bazakos et al. |
| 7,652,251 B1 | 1/2010 | King |
| 7,755,612 B2 | 7/2010 | Park et al. |
| 7,759,882 B2 | 7/2010 | Korcharz |
| 7,994,517 B2 | 8/2011 | Yang |
| 8,026,908 B2 | 9/2011 | Ku et al. |
| 8,368,663 B2 | 2/2013 | Izadi et al. |
| 8,384,818 B2 | 2/2013 | Hiramoto et al. |
| 8,417,296 B2 | 4/2013 | Caballero et al. |
| 8,669,924 B2* | 3/2014 | Kuo ................... G09G 5/10 345/82 |
| 8,924,644 B2* | 12/2014 | Atherton ........... G06F 12/0842 711/118 |
| 9,141,233 B2 | 9/2015 | Chung et al. |
| 9,618,746 B2 | 4/2017 | Browne |
| 9,679,513 B2 | 6/2017 | Lynch et al. |
| 10,056,029 B2 | 8/2018 | Lynch et al. |
| 2002/0047550 A1 | 4/2002 | Tanada ................. G09G 3/2011 315/155 |
| 2004/0031966 A1* | 2/2004 | Forrest ................ H01L 27/3269 257/79 |
| 2005/0037815 A1* | 2/2005 | Besharat ................ G09G 5/02 455/566 |
| 2005/0179706 A1* | 8/2005 | Childers ................. H04N 5/58 345/690 |
| 2005/0232469 A1* | 10/2005 | Schofield ............... B60Q 1/08 382/104 |
| 2006/0007224 A1* | 1/2006 | Hayashi ................. G06F 3/042 345/207 |
| 2006/0044300 A1* | 3/2006 | Koyama ............. H01L 27/3269 345/207 |
| 2006/0171704 A1* | 8/2006 | Bingle ................. H04N 5/2254 396/419 |
| 2007/0097333 A1 | 5/2007 | Zacarehi et al. |
| 2007/0152217 A1* | 7/2007 | Lai ...................... H01L 29/7869 257/59 |
| 2007/0257250 A1* | 11/2007 | Tseng ................. H01L 27/3269 257/40 |
| 2008/0024476 A1* | 1/2008 | Choi ..................... G02F 1/1362 345/207 |
| 2008/0121442 A1 | 5/2008 | Boer et al. |
| 2008/0122803 A1 | 5/2008 | Izadi et al. |
| 2008/0252618 A1 | 10/2008 | Chung et al. |
| 2009/0237381 A1* | 9/2009 | Otani ................... G09G 3/3648 345/207 |
| 2009/0305742 A1 | 12/2009 | Caballero et al. |
| 2010/0225617 A1* | 9/2010 | Yoshimoto ............. G06F 3/042 345/175 |
| 2010/0277410 A1 | 11/2010 | You |
| 2010/0283765 A1* | 11/2010 | Gotoh .................. G06F 3/0412 345/175 |
| 2011/0074750 A1 | 3/2011 | Leon |
| 2011/0148752 A1 | 6/2011 | Alameh et al. |
| 2011/0148835 A1* | 6/2011 | Yamazaki ............ G09G 3/2003 345/207 |
| 2011/0250928 A1 | 10/2011 | Schlub et al. |
| 2012/0044444 A1 | 2/2012 | Park et al. |
| 2012/0133799 A1 | 5/2012 | Findlay |
| 2012/0134150 A1 | 5/2012 | Catalano et al. |
| 2012/0306381 A1* | 12/2012 | Adler ..................... H05B 31/50 315/152 |
| 2013/0075595 A1 | 3/2013 | Ruh |
| 2013/0088766 A1* | 4/2013 | Uken ..................... B60R 1/088 359/267 |
| 2013/0094126 A1 | 4/2013 | Rappoport et al. |
| 2014/0070078 A1 | 3/2014 | Land et al. |
| 2014/0191110 A1 | 7/2014 | Holenarsipur |
| 2014/0197317 A1 | 7/2014 | Yang et al. |

* cited by examiner

ORGANIC LIGHT EMITTING DIODE DISPLAY HAVING PHOTODIODES

This application is a continuation of U.S. patent application Ser. No. 16/105,812, filed Aug. 20, 2018, which is a continuation of U.S. patent application Ser. No. 15/619,358, filed Jun. 9, 2017, now U.S. Pat. No. 10,056,029, which is a continuation of U.S. patent application Ser. No. 14/746,602, filed Jun. 22, 2015, now U.S. Pat. No. 9,679,513, which is a continuation of U.S. patent application No. 13/364,100, filed Feb. 1, 2012, now U.S. Pat. No. 9,064,451, all of which are hereby incorporated by reference herein in their entireties.

BACKGROUND

The present disclosure relates generally to electronic displays and, more particularly, to photodetectors in a display.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices and systems increasingly include display screens as part of the user interface of the device or system. As may be appreciated, display screens may be employed in a wide array of devices and systems, including desktop computer systems, notebook computers, and handheld computing devices, as well as various consumer products, such as cellular phones, televisions, and portable media players.

To display images, videos, and user interfaces, displays use arrays of pixels, each pixel having multiple colors. Primary colors of light (e.g., red, green, and blue) may be combined in each pixel to create many other colors, including white. Controllers drive pixels with coordinated instructions to create an image on the display. Some displays involve illuminating a backlight through a light-modulating liquid crystal layer (e.g., typical liquid crystal displays) while others involve directly illuminating each pixel to a desired intensity (e.g., organic light emitting diode (OLED) displays).

Because each OLED may emit its own colored light, OLED displays may be thinner and lighter than displays requiring a backlight. OLEDs may also be desirable because they may be fabricated on flexible or rigid substrates. OLED displays may also allow better viewing angles and better color than some liquid crystal displays (LCDs).

However, displays do not always operate in the same lighting environments. The perception of emitted light from a display may be affected by lighting conditions. Changing the brightness of a display can improve the perceived image of the display. For example, a dim display may provide sufficient visibility in dark environments, while a bright display may provide better visibility in a bright environment. However, controlling the brightness of a display to improve display visibility may not always be as straightforward as changing the brightness of the entire display according to a single measurement of the environmental light. For example, the ambient light on a display may not be uniform across the display, and displays are frequently moved such that their surrounding environment is dynamic.

Furthermore, the appearance of OLED displays may not remain constant indefinitely. As OLED displays age through use, their brightness and/or color may change. Some OLEDs, particularly blue OLEDs, age more quickly than others, which may change the appearance of the display. Over time as the OLEDs age, images shown on parts of the display may appear much different from the intended image. OLED controllers may make changes to compensate for such shifts in brightness and color. However, aging may occur differently across a display. For example, aging may occur in an unpredictable manner due to the manner in which end users use the device.

Further, OLED displays may be used on many mobile devices, including cellular phones and such. OLED displays may also be touch-sensitive. Presently, it is desirable to utilize a proximity sensor to turn off the display when a user places the phone near the user's face. This both saves power and prevents undesired inputs to the touch screen. However, such proximity sensors are typically placed outside of the display area, thus creating some inaccuracies when turning the display on and off.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure relate to OLED displays and methods to adjust OLED displays to maintain a desired appearance. Photodetectors may be disposed in the OLED display with individual OLEDs or zones of OLEDs to adjust their emitted light. In an embodiment, each photodetector may detect light incident to the display. Such detected light may be from OLEDs of the display, from the ambient light, or both. Ambient light may affect how the light emitted from the display is perceived. For example, a corner portion of the display may be in a shadow while the remainder is under a bright light. If all the OLEDs are set to the same brightness and/or color level, either the shaded corner or the remainder of the display may be less visible than the other. The photodetectors may enable controllers to brighten or dim the entire display and/or compensate each OLED or group of OLEDs (e.g., OLEDs in the corner portion) to improve the appearance of the display as a whole. This may improve the versatility of the display in different operating environments.

In other embodiments, each OLED may be adjacent to a photodetector to measure the aging characteristics of that particular OLED. Aged OLEDs may emit light different from less aged OLEDs, which may result in a poor display quality for unevenly aged displays. For example, if all the blue OLEDs in a region of the display have aged more than the red and green OLEDs, that region of the display may appear dimmer and/or more yellow than desired. As portions of the display age at different rates, the quality of a displayed image may decrease. By adjusting the driving strength of each OLED, controllers may compensate individual OLEDs for shifts in brightness and/or color based on the photodetector measurements of each OLED's aging. Compensations to driving strength may cause an OLED to emit brighter light and/or light of a different wavelength than before the compensation. This adjusted OLED may now emit light at a desired brightness and/or color. This may prolong the useful life of a display and maintain a desirable display appearance for longer than would otherwise be possible.

In other embodiments, multiple photodetectors may be disposed in an OLED display to sense the proximity of nearby objects, including a user's finger or face. Photodetectors may be disposed with OLEDs or zones of OLEDs across the display, as mentioned above, or in a peripheral area of the display to control when the OLED display is to be turned off. In an embodiment, when the photodetectors sense the user's face near the display, the display may be turned off.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
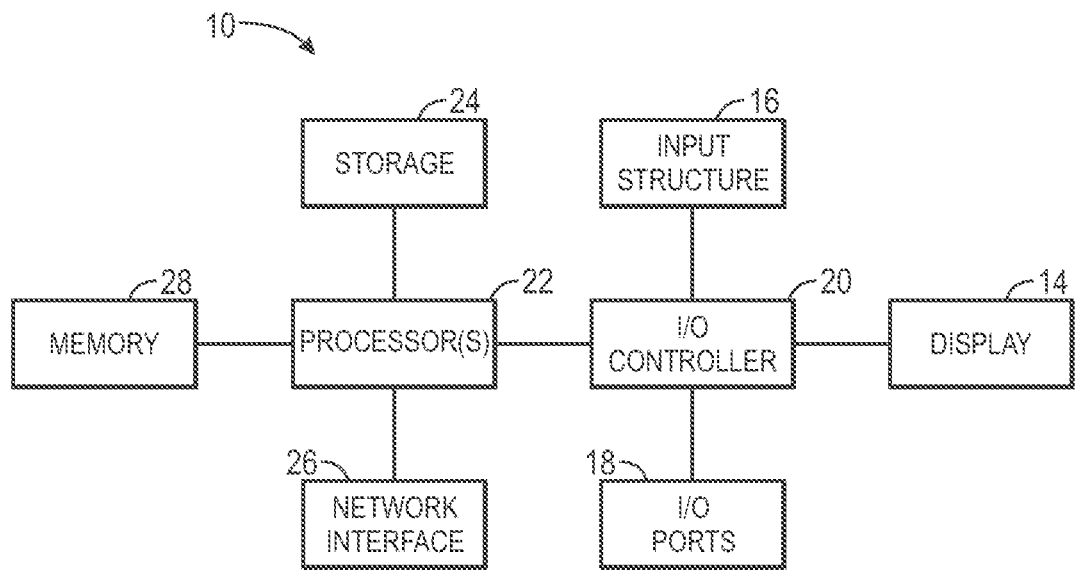
FIG. 1 is a block diagram of an electronic device with an electronic display and its components, in accordance with aspects of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features The present disclosure is directed to systems, displays, and techniques integrating photodetectors with an electronic display to improve the appearance and/or functionality of the display. OLED displays use an array of OLEDs to show an image across the display. Each OLED emits light of a certain color and brightness based on its driving conditions and internal components. Ambient light may affect the perception and appearance of the color and/or brightness of the light emitted by the display. Photodetectors disposed within an OLED display may detect ambient light on different parts of the display so that OLED controllers may make compensations to the driving conditions of part or all of the display. Sufficient compensation results in a display with a uniform appearance regardless of differences in ambient light across the display.

Also, the color and brightness of an OLED are not constant over time under the same driving conditions. As an OLED ages, the color and/or brightness of its emitted light changes. Photodetectors disposed within an OLED display may detect these changes so that OLED controllers may make compensations to the driving conditions to counter the effects of aging. In some embodiments, photodetectors are disposed in the display with each OLED such that each OLED may be compensated according to its unique aging characteristics. In other embodiments, photodetectors may be disposed in the display with groups of OLEDs. For example, the driving strengths may be adjusted by manufacturing settings, user input, and/or transmitted information from sensors such as photodetectors. In some embodiments, calibration curves may be employed to adjust the driving strengths of OLEDs or zones of OLEDs to compensate for ambient light and/or aging effects.

The photodetectors also may be used to detect objects near the display. A photodetector may transmit information corresponding to a detected object to a controller. This transmitted information may be used to control the activation setting of the whole display or portions thereof. Furthermore, the transmitted information may be used to provide additional functionality to a touch screen interface.

A variety of electronic devices may incorporate the OLED displays having photodetectors disposed as mentioned above. One example appears in a block diagram of FIG. 1, which describes an electronic device 10 that may include, among other things, one or more processors 22, memory 28, nonvolatile storage 24, a display 14, input structures 16, an input/output (I/O) controller 20, I/O ports 18, and/or a network device 26. The various functional blocks shown in FIG. 1 may include hardware, executable instructions, or a combination of both. In the present disclosure, the processor(s) 22 and/or other data processing circuitry may be generally referred to as "data processing circuitry." This data processing circuitry may be embodied wholly or in part as software, firmware, hardware, or any combination thereof. Furthermore, the data processing circuitry may be a single, contained processing module or may be incorporated wholly or partially within any of the other elements within the electronic device 10.

As shown in FIG. 1, the processor(s) 22 and/or other data processing circuitry may be operably coupled with the memory 28 and the nonvolatile storage 24. In this way, the processor(s) 22 may execute instructions to carry out various functions of the electronic device 10. Among other things, these functions may include generating image data to be displayed on the display 14. The programs or instructions executed by the processor(s) 22 may be stored in any suitable article of manufacture that includes one or more tangible, computer-readable media at least collectively storing the instructions or routines, such as the memory 28 and/or the nonvolatile storage 24. The memory 28 and the nonvolatile storage 24 may represent, for example, random-access memory, read-only memory, rewritable flash memory, hard drives, and optical discs.

The depicted electronic device 10 includes a display 14, such as an OLED display. In accordance with certain embodiments, the display 14 may include or be provided in conjunction with touch sensitive elements. Such a touch-sensitive display may be referred to as a "touch screen" and may also be known as or called a touch-sensitive display system. For example, the display 14 may be a MultiTouch™ touch screen device that can detect multiple touches at once.

Figure 2:
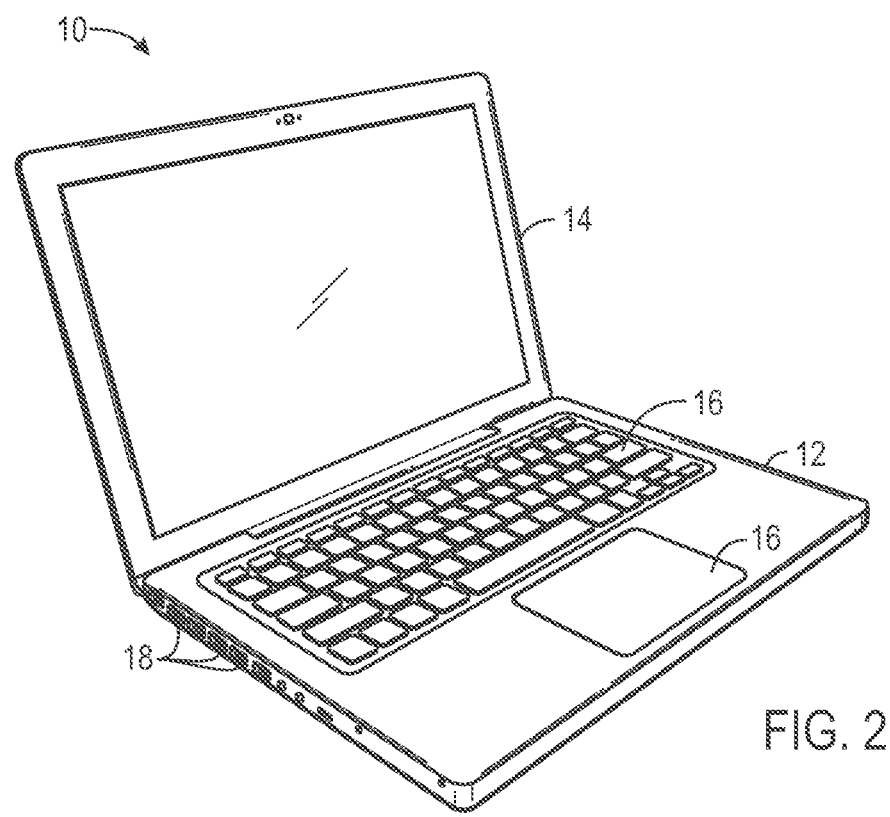
FIG. 2 is a perspective view of an example of the electronic device of FIG. 1 in the form of a computer, in accordance with aspects of the present disclosure.
Figure 3:
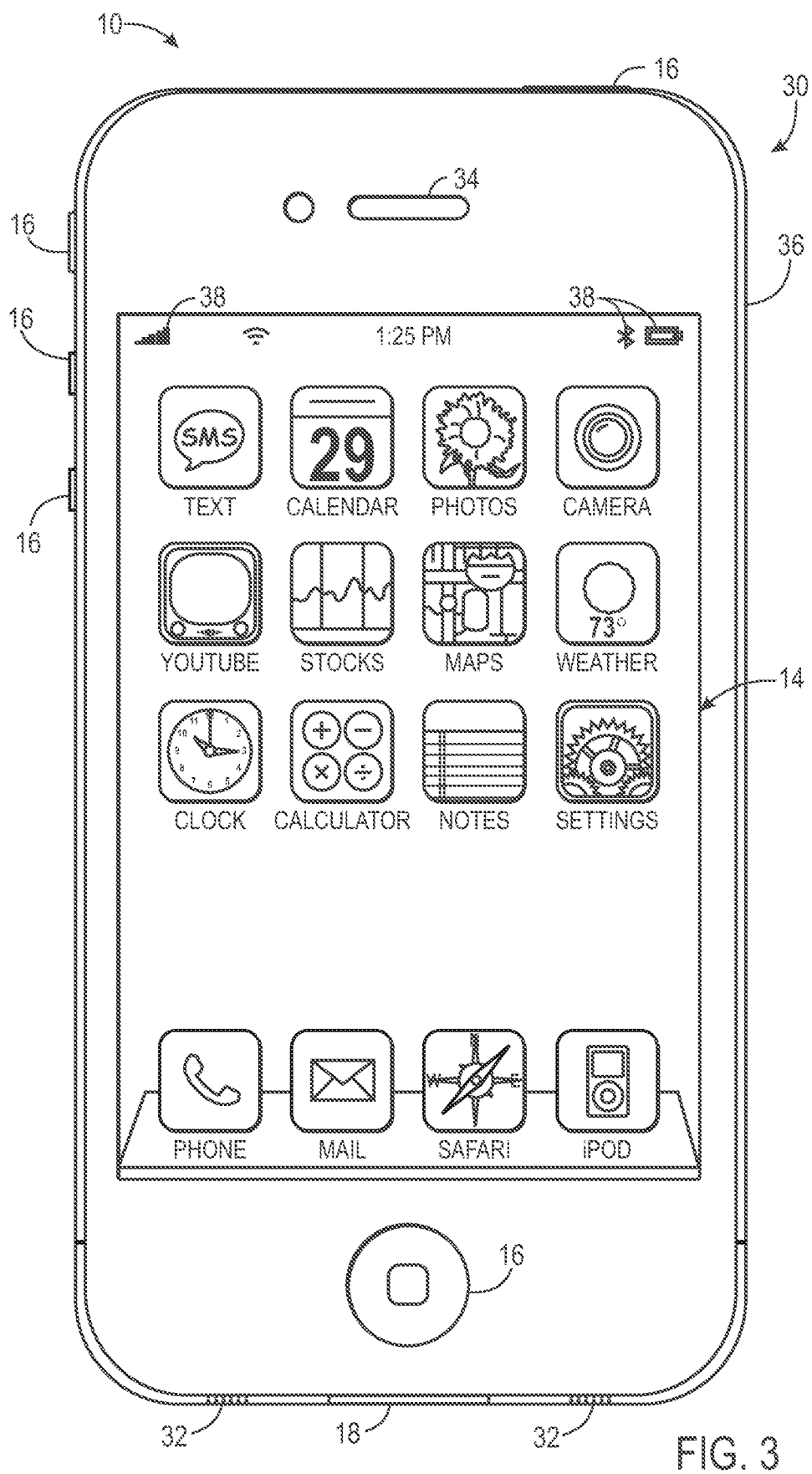
FIG. 3 is a front view of an example of the electronic device of FIG. 1 in the form of a handheld device, in accordance with aspects of the present disclosure.

FIG. 1 is merely one example of a particular implementation and is intended to illustrate generally the types of components that may be present in an electronic device 10. These components may be found in various examples of the electronic device 10. By way of example, the electronic device 10 of FIG. 1 may be embodied as a computer as depicted in FIG. 2, a handheld device as depicted in FIG. 3, a tablet computer (not shown), or similar devices. Such electronic devices as depicted in FIG. 2 may include a model of a MacBook®, a MacBook® Pro, MacBook Air®, iMac®, Mac® mini, or Mac Pro® available from Apple Inc. of Cupertino. California.

As illustrated in FIG. 2, electronic device 10 includes housing 12 that supports and protects interior components, such as processors, circuitry, and controllers, among others, that may be used to generate images on display 14. Housing 12 also allows access to user input structures 16, such as a touch screen, keypad, track pad, and buttons that may be used to interact with electronic device 10. For example, user input structures 16 may be manipulated by a user to operate a graphical user interface (GUI) and/or applications running on electronic device 10. In some embodiments, input structures 16 may be manipulated by a user to control properties of display 14, such as the brightness or color. The electronic device 10 also may include various I/O ports 18 that allow connection of device 10 to external devices, such as a power source, printer, network, or other electronic device.

The electronic device 10 may also take the form of a handheld device 30, as generally illustrated in FIG. 3. The handheld device 30 may represent, for example, a portable phone, a media player, a personal data organizer, a handheld game platform, or any combination of such devices. By way of example, the handheld device 30 may be a model of an iPod® or iPhone® available from Apple Inc. of Cupertino, California. In other embodiments, the handheld device 30 may be a tablet-sized embodiment of the electronic device 10, which may be, for example, a model of an iPad® available from Apple Inc.

The handheld device 30 may include an enclosure 36 to protect interior components from physical damage and to shield them from electromagnetic interference. The enclosure 36 may surround the display 14, which may display indicator icons 38. The indicator icons 38 may indicate, among other things, a cellular signal strength, Bluetooth connection, and/or battery life. The I/O interfaces 18 may open through the enclosure 36 and may include, for example, a proprietary I/O port from Apple Inc. to connect to external devices. User input structures 16 in combination with the display 14, may allow a user to control the handheld device 30. A microphone 32 may obtain a user's voice for various voice-related features, and a speaker 34 may enable audio playback and/or certain phone capabilities.

OLED displays may be incorporated in the electronic device 10, such as the computer or handheld device 30 as described above. Portions of different embodiments of photo-sensing OLED displays illustrated in FIGS. 4-6 may generally be referred to as displays 14A, 14B, and 14C respectively. It may be appreciated that the OLED layer 44 may have multiple components, including an anode and a cathode with one or more organic layers disposed between the anode and cathode. Upon application of an appropriate voltage to the OLED layer 44, positive and negative charges combine in the organic layer(s) to emit light. The characteristics of this emitted light depend at least in part on the applied voltage and properties of the organic layer(s).

Figure 4:
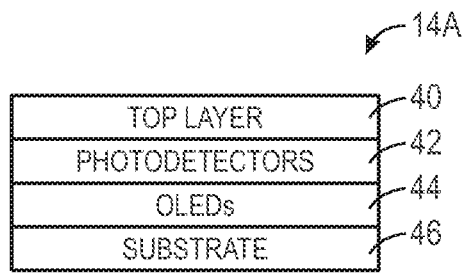
FIG. 4 is a cross-sectional side view of a portion of an OLED having a sensor disposed over an OLED device, in accordance with aspects of the present disclosure.

As illustrated in FIG. 4, an embodiment of an OLED display 14 may include multiple layers. The OLED layer 44 may be disposed over a substrate 46 and a top layer 40 may be disposed over the OLED layer 44. The substrate 46 may include glass, plastic, other suitable materials, or combinations thereof, and may be either a rigid or flexible material. Further, in different embodiments the substrate 46 may be opaque, reflective, translucent, or transparent. The top layer 40 may form an environmental barrier to lessen the exposure of the OLED layer 44 to environmental elements such as air, oxygen, water, oils, radiation, and other elements with negative effects on the OLED layer 44. In some embodiments, the top layer 40 may also protect the OLED layer 44 from direct environmental contact and shock. The top layer 40 may include glass, plastic, other suitable materials, or combinations thereof, and may be either a rigid or flexible material.

OLED displays may be categorized as bottom or top emission. In bottom emission OLED displays, the OLEDs emit light toward and through the substrate 46. Bottom emission may utilize a transparent or semi-transparent substrate 46 and bottom electrode so that emitted light may pass through both layers. Top emission OLED displays include OLEDs that emit light opposite the substrate 46. The substrate 46 of a top emission OLED display may be opaque, reflective, translucent, or transparent.

Figure 5:
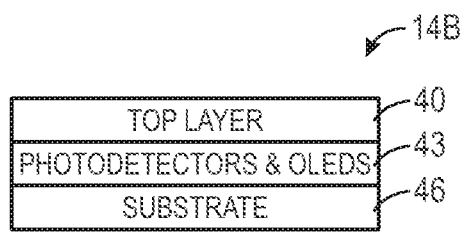
FIG. 5 is a cross-sectional side view of a portion of an OLED having a sensor in the OLED layer, in accordance with aspects of the present disclosure.
Figure 6:
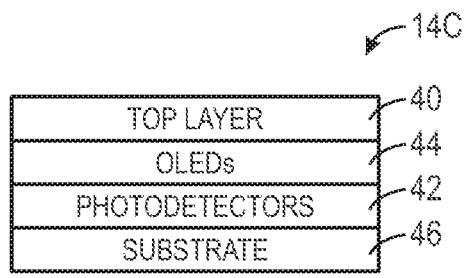
FIG. 6 is a cross-sectional side view of a portion of an OLED having a sensor disposed beneath an OLED device, in accordance with aspects of the present disclosure.

The OLED display 14 may also include a sensor layer 42. The sensor layer 42 may include sensors such as photodetectors, photo diodes, photo resistors, photocells, and combinations thereof. In various embodiments the sensors may be disposed in the substrate such that they receive light from the direction of the substrate or the direction opposite the substrate, and combinations thereof. In some embodiments, a photo-sensing OLED display 14A may include a sensor layer 42 disposed between the OLED layer 44 and the top layer 40. The sensor layer 42 may be substantially transparent in the OLED display 14A, such that light emitted by the OLED layer 44 may transmit through the sensor layer 42 and out of the OLED display 14A. In another embodiment as illustrated in FIG. 5, the sensors and OLEDs may be on the same layer 43 between the substrate 46 and the top layer 40. In such an embodiment, the photodetectors may be fabricated with the OLEDs during the thin film transistor (TFT) fabrication process or another fabrication process. In yet another embodiment as illustrated in FIG. 6, the sensor layer 42 may be disposed directly over the substrate 46 and beneath both the OLED layer 44 and top layer 40. In another embodiment, sensors may be disposed in multiple layers.

The sensors disposed within layers 42 or 43 of OLED displays 14A, 14B, and 14C may be configured to detect aging characteristics or OLEDs, ambient light, nearby objects, or any combination thereof. Sensors that receive the light emitted from OLEDs may be configured to detect aging characteristics. For example, for an OLED display 14A as shown in FIG. 5, sensors disposed above the OLED layer 44 and directed towards top emission OLEDs may be configured to detect aging characteristics of the OLEDs. As another example, sensors directed upward and disposed below the OLED layer 44 of bottom emission OLEDs in accordance with FIG. 6 may also be configured to detect aging characteristics. Sensors that receive ambient light may be configured to detect ambient light properties and nearby objects. For example, sensors directed toward the top layer 40 and disposed above the OLED layer 44 of top emission OLEDs may be configured to detect ambient light and/or nearby objects.

Figure 7:
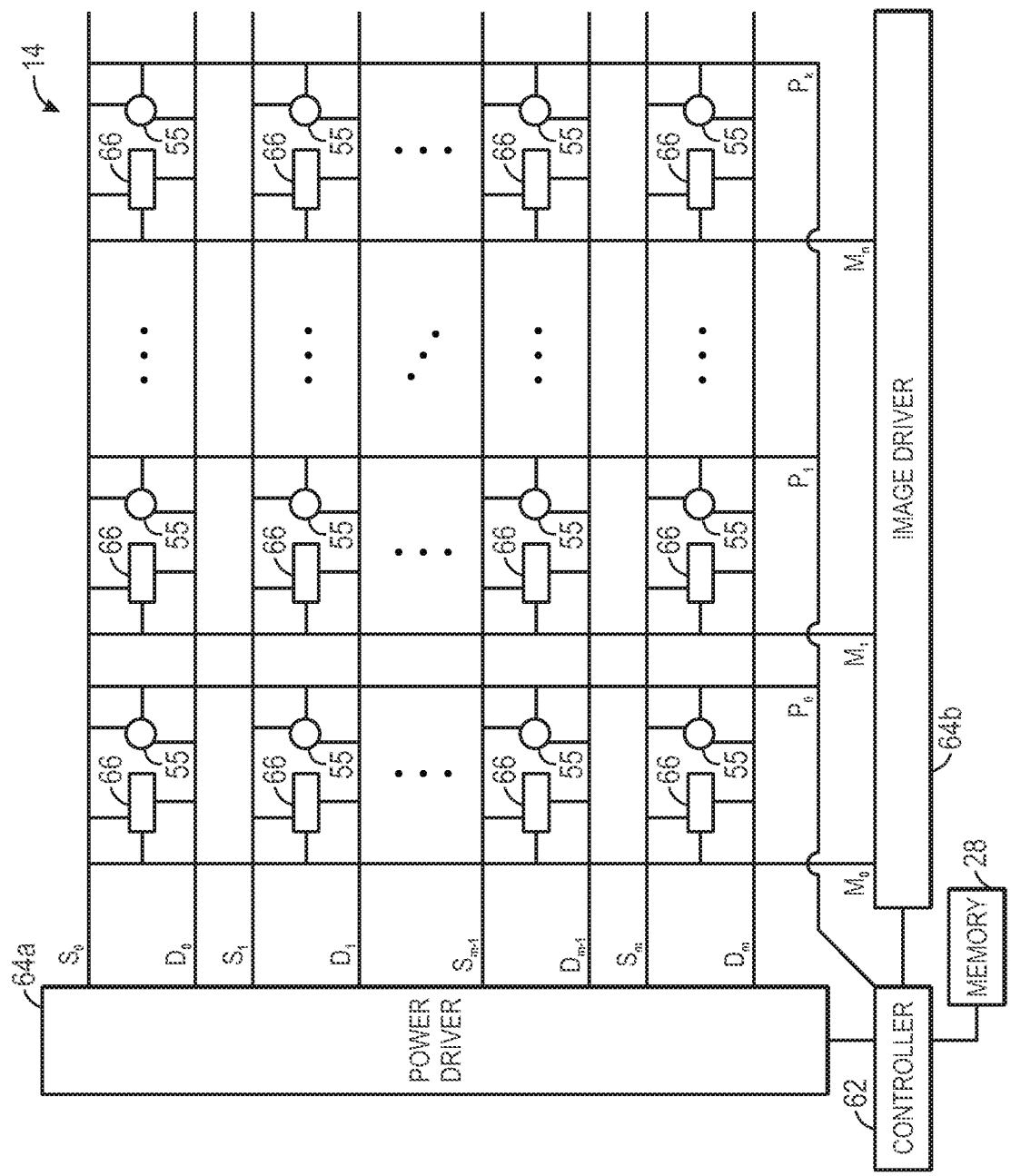
FIG. 7 is a front view of an OLED array with a respective photodetector disposed with each OLED, in accordance with aspects of the present disclosure.

Additional details of the display 14 may be better understood through reference to FIG. 7, which is a schematic of an OLED array. A display 14 may have an array of OLEDs 66, photodetectors 55, a power driver 64a, an image driver 64b, a controller 62, and possibly other components. The OLEDs 66 are driven by the power driver 64a and the image driver 64b (collectively drivers 64). In some embodiments, the drivers 64 may include multiple channels for independently driving multiple OLEDs 66 with one driver 64.

The power driver 64a may be connected to the OLEDs 66 by way of scan lines $S_0, S_1, \ldots S_{m-1}$, and $S_m$ and driving lines $D_0, D_1, \ldots D_{m-1}$, and $D_m$. OLEDs 66 receive on/off instructions through the scan lines $S_0, S_1, \ldots S_{m-1}$, and $S_m$ and generate driving currents corresponding to data voltages transmitted from the driving lines $D_0, D_1, \ldots D_{m-1}$, and $D_m$. The driving currents are applied to each OLED 66 to emit light according to instructions from the image driver 64b through driving lines $M_0, M_1, \ldots M_{n-1}$, and $M_n$. Both the power driver 64a and the image driver 64b transmit voltage signals through respective driving lines to operate each OLED 66 at a state determined by the OLED controller 62. Each driver 64 may supply voltage signals at a suitable duty cycle and/or amplitude sufficient to operate each OLED 66.

Drivers 64 may include one or more integrated circuits that may be mounted on a printed circuit board and controlled by OLED controller 62. Drivers 64 may include a voltage source that provides a voltage to OLEDs 66 for example, between the anode and cathode ends of each OLED layer. This voltage causes current to flow through the OLEDs 66 to emit light. Drivers 64 also may include voltage regulators. In some embodiments, the voltage regulators of the drivers 64 may be switching regulators, such as pulse width modulation (PWM) or amplitude modulation (AM) regulators. Drivers 64 using PWM adjust the driving strength by varying the duty cycle. For example, the OLED controller 62 may increase the frequency of a voltage signal to increase the driving strength for an OLED 66. Drivers 64 using AM adjust the amplitude of the voltage signal to adjust the driving strength.

Each OLED 66 may emit light at an original brightness and original color when driven with an original drive strength. When the drive strength is adjusted, like by PWM or AM, the light emitted from an OLED 66 will vary from the original brightness and original color. For example, the duty cycles for individual OLEDs 66 may be increased and/or decreased to produce a color or brightness that substantially matches a target color or brightness for each OLED 66. Furthermore, over time and through use of an OLED 66, the color and brightness of emitted light will also vary even when driven with the original drive strength. In some embodiments, a controller 62 may adjust the drive strength of an OLED 66 throughout its useful life such that the color and/or brightness of its emitted light remains substantially the same, at least the same relative to other OLEDs 66 of the display 14.

OLED controller 62 may adjust the driving strength by changing the drive instructions given to the drivers 64. Specifically, OLED controller 62 may send control signals to drivers 64 to vary the voltage and/or the duty cycle applied to certain OLEDs 66. For example, OLED controller 62 may vary the voltage applied by drivers 64 to an OLED 66 to control the brightness and/or the chromaticity of that OLED 66. By increasing the voltage applied to an OLED 66, the brightness of that OLED 66 increases. In contrast, decreasing the voltage applied to an OLED 66 decreases its brightness. In other embodiments, the ratio of the voltages applied to a group of OLEDs 66 may be adjusted to substantially match the brightness of other OLEDs 66 while maintaining a relatively constant color.

OLEDs 66 may be arranged in groups within the display to form pixels. Pixels may include groups of OLEDs 66 (e.g., three or four) emitting different colors, particularly complementary colors such as red, cyan, green, magenta, blue, yellow, white, and combinations thereof. These light colors from each OLED 66 are mixed according to instructions from the OLED controller 62 to create specific colors, including white, for each pixel. Together, the specific colors for each pixel of the display 14 form an image on the display 14. The driving strength of some or all of the OLEDs 66 may be adjusted to achieve a uniform appearance for the display 14. An ideal uniform display 14 may be such that if each pixel was instructed to emit the same color and brightness, a user would not perceive color or brightness variations across the display 14. Rather, the entire display would have substantially the same color and brightness as perceived by the user.

The age of each OLED 66 and the ambient environment may alter the appearance of a display or portions of it unless these effects are compensated. OLEDs 66 of different colors typically do not have the same aging profiles. Some colored OLEDs, like red OLEDs, may produce substantially the same colored light at substantially the same brightness for many hours, while other colored OLEDs, particularly blue OLEDs, may exhibit substantial changes in color and brightness over the same period. Generalized brightness and chromaticity profiles may be stored in memory 28 to use for dynamically compensating OLEDs 66. To compensate for such changes, different colored OLEDs 66 in the same pixel may be driven differently over time to emit light at the target brightness and/or target color. In addition, pixels may contain multiple OLEDs 66 of the same color so that some may be deactivated after a useful lifetime while others are activated.

In some embodiments, photodetectors 55 adjacent to OLEDs 66 provide the controller 62 with information related to the aging characteristics of OLEDs 66. Photodetectors 55 may be coupled to the OLED controller 62 by way of photodetector lines $P_0, P_1, \ldots P_k$. In some embodiments as shown in FIG. 7, each photodetector 55 may be disposed with an OLED 66 in a 1:1 ratio. Each photodetector 55 measures the light emitted by its respective OLED 66 and transmits this measurement to the OLED controller 62. Photodetectors 55 may measure the chromaticity (color) and brightness of emitted light. The OLED controller 62 may determine compensation adjustments to each OLED 66 based on a comparison between the measured and target values for color and/or brightness of each OLED 66.

Complementary colors of light may be combined to produce substantially white light. However, different light sources may not produce the same shade of white. A white point of a light source is a set of chromaticity values used to compare light sources. The white point of a pixel is associated with its color and its component OLEDs. With respect to pixels of combined light sources, the required driving strength for each component color to maintain a white point may change due to numerous factors, including aging.

In some embodiments, to compensate for brightness and/or color shifts due to aging of OLEDs, OLED controller 62 may increase the driving strength of aged OLEDs 66, decrease the driving strength of less aged OLEDs 66, or increase the driving strength of some aged OLEDs 66 and decrease the driving strength of other less aged OLEDs 66. Based on measurements from photodetectors 55, OLED controller 62 may determine the direction of the white point shift of a pixel and increase the driving strength of one or more OLEDs 66 within or near the pixel with a color complementary to the white point shift. For example, if a photodetector 55 has detected that the white point of pixel has shifted towards a blue tint. OLED controller 62 may increase the driving strength of yellow tinted OLEDs 66 in or near that pixel. OLED controller 62 also may decrease the driving strength of one or more OLEDs 66 with a tint similar to the direction of the detected white point shift in this pixel. For example, if the white point has shifted towards a blue tint in a particular pixel, the OLED controller 62 may decrease the driving strength of blue tinted OLEDs 66 in that pixel.

OLED controller 62 may govern operation of a driver 64 using information stored in memory 28. For example, memory 28 may store values defining the target brightness and/or color of each OLED 66, as well as calibration curves, tables, algorithms, or the like. The memory 28 may also store values defining driving strength adjustments that may be made to compensate for a shift in the emitted brightness or color. In some embodiments, the OLED controller 62 may dynamically adjust the driving strengths throughout operation of the display 14 to maintain a light output that matches the target brightness or color. For example, OLED controller 62 may receive transmitted information from photodetectors 55 describing color and/or brightness of the emitted light. Using the transmitted information from photodetectors 55, OLED controller 62 may adjust the driving strengths to maintain a light output from each OLED 66 that matches the target brightness and/or color for that OLED 66. In an embodiment, OLEDs 66 may not be adjusted to compensate for differences between targeted and measured color and brightness if the adjustment would not be perceivable. An adjustment may not be perceivable if the difference between emitted and targeted light is slight.

In other embodiments, OLED controller 62 may receive signals from other sources instead of, or in addition to, photodetectors 55. For example, OLED controller 62 may receive user transmitted information through input structure 16 (FIG. 2) of electronic device 10. Electronic device 10 may include hardware and/or software components allowing user adjustment of the brightness and/or color emitted by OLEDs 66 across the display 14, or for particular portions of the display 14. In some embodiments, display 14 may include a brightness control that allows a user to select the brightness within a set range. In other embodiments, display 14 may include a color temperature control that allows a user to select the color temperature (for example, from a set of fixed values) of the light emitted when display 14 receives an electrical signal corresponding to a white light. OLED controller 62 also may receive input from the device 10. For example, the device 10 may include a clock that tracks total operating hours of OLEDs 66. In some embodiments, OLED controller 62 may compare the operating hours to a calibration curve or table stored in memory 28 to determine a driving strength adjustment in conjunction with other adjustments made to OLEDs 66.

Figure 8:
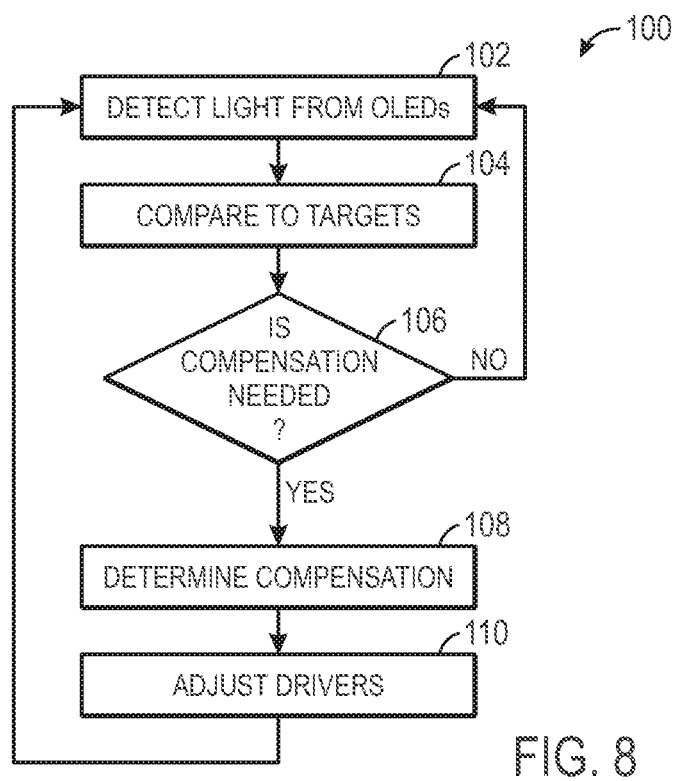
FIG. 8 is a flowchart depicting a method for operating an OLED display to compensate for aging OLEDs, in accordance with aspects of the present disclosure.

FIG. 8 depicts a flowchart of a method 10 for employing photodetectors 55 to adjust the brightness and/or color of OLEDs 66 of a display 14 to compensate for aging. Aging may include shifts in the chromaticity or luminance of an OLED 66 over time and use. The OLED aging method 100 may begin by detecting (block 102) light emitted by the OLEDs 66. In some embodiments, each photodetector 55 and each OLED 66 are disposed in the display in a 1:1 ratio. Other ratios are envisioned, including but not limited to 1:2, 1:3, 1:4, 1:6, 1:50, 1:100, 1:200 or ranges there between. An OLED controller 62 receives signals relating to the detected light from each photodetector 55. The OLED controller 62 then compares (block 104) the properties of light emitted from each OLED 66 to the target color and brightness values for each OLED 66. If a deviation exists, then the controller determines (node 106) whether compensation is needed for each OLED. Compensation may not be made if the adjustment would be imperceptible to end users or if the end user has disabled such adjustments, etc. In such circumstances where compensation is not made, the OLED controller 62 continues to monitor the signal from photodetectors 55 to determine when adjustments would be desirable.

If compensation for an OLED 66 should be made, the OLED controller 62 then determines (block 108) the compensation for each OLED 66 so that the emitted light substantially matches the targeted emitted light for each respective OLED 66. The compensation may be determined by considering numerous factors, including OLED specific factors like the measured emitted light properties, present drive strength, previous drive strength adjustments, recorded operating hours, and/or information stored in memory 28 like calibration curves, algorithms, and charts. Based on these factors, the OLED controller 62 may then determine the changes in brightness and/or color needed to compensate each OLED 66 for the aging detected by the proximate photodetector 55. Changes in brightness and/or color for each OLED 66 may improve the image quality of a display 14.

For example, an OLED 66 may have aged more rapidly due to defective components, use, temperature, or other factors. This differentially aged OLED 66 may affect the appearance or viewability of the display because this OLED 66 has a different brightness and/or color from other nearby OLEDs 66 that aged normally. The OLED controller 62 may determine a driving strength adjustment to the differentially aged OLED 66 to make the emitted light substantially match other OLEDs 66 or a color and/or brightness target. Alternatively, the OLED controller 62 may determine a driving strength adjustment to the other less aged OLEDS 66 or surrounding OLEDs 66 to make the differentially aged OLED 66 less noticeable than before. As another alternative, the OLED controller 62 may determine driving strength adjustments to the differentially aged OLED 66 and the normally aged OLEDs 66 to improve the overall viewability of the display. The OLED controller 62 may employ AM, PWM, or other suitable techniques to vary the driving strength.

As discussed above, aging compensation adjustments to the driving strength of OLEDs 66 may be based on different factors. Adjustments may be made by the OLED controller 62 based on operating time and comparison with compensation information 70 stored in memory 28, the signal from photodetectors 55, and combinations thereof. For example, the OLED controller 62 may drive the OLEDs 66 in each zone according to calibration curves and algorithms stored in memory 28 and make fine tuning adjustments based on the signal from each photodetector 55. Once the new driving strengths have been determined, OLED controller 62 may transmit (block 110) the adjustment instructions to the drivers 64.

In some embodiments, each photodetector 55 may be disposed in the display 14 with more than one OLED 66. In one embodiment illustrated in FIG. 9, photodetectors 55 are disposed in zones 60 of the display 14. A photodetector 55 may be disposed in the display 14 in each zone 60 to detect light incident to each zone 60. For example, light received by each zone 60 across the display 14 may not be uniform, affecting the appearance of the display. As described above, photodetectors 55 may detect light properties including the chromaticity and brightness. The photodetectors 55 may transmit information in the form of an electrical signal in response to the detected light to the OLED controller 62.

In an embodiment, the display 14 includes an array of zones 60. Each zone 60 includes at least one photodetector 55 and at two or more OLEDs 66 proximate to the photodetector 55. In some embodiments, the photodetectors 55 may be able to detect red, green, blue, and/or white light and the intensities of such light. Photodetectors 55 that detect a certain color of light may be used to adjust the driving strength of proximate OLEDs 66 that emit that color of light. Furthermore, in some embodiments, zones 60 may overlap, such that some OLEDs 66 may lie in more than one zone. For example, each zone 60 may include multiple OLEDs 66 of only one OLED color (e.g., red zones, blue zones, and green zones). In one embodiment, one portion of the display 14 may include multiple overlapping zones where each zone 60 has a photodetector 55 capable of recognizing a particular color. For example, a first array of zones 60 may include a first OLED color (e.g., red) and a first photodetector 55 configured to detect the first OLED color, a second array of zones 60 overlapping the first array may include a second OLED color (e.g., green) and a second photodetector 55 configured to detect the second OLED color, and a third array of zones 60 overlapping both the first and second arrays may include a third OLED color (e.g., blue) and a third photodetector 55 configured to detect the third OLED color. This may reduce the number of photodetectors 55 utilized while providing information on zones 60 of OLEDs 66 of a particular color for fine-tuning adjustments to the display 14.

Figure 9:
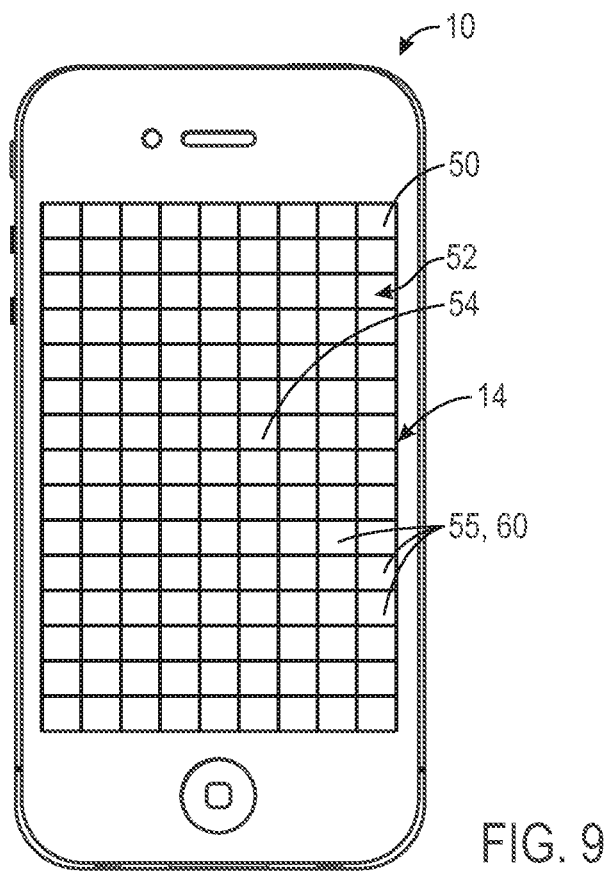
FIG. 9 is a front view of zones across the display of a handheld device, in accordance with aspects of the present disclosure.

The zones 60 may be arranged in a grid or in a matrix over the plane of the display 14 as shown in FIG. 9, but zone arrangements may not be limited to this configuration. In some embodiments, zones 60 may be arranged in strips, circles, or irregular shapes. Zones 60 may be of uniform shape and size across the display 14, or have varied shapes and sizes. In some embodiments, certain areas of the display 14 will have more zones 60 and thus more photodetectors 55 than others areas. Zones 60 may be defined as having a certain number of OLEDs 66 or as the OLEDs 66 closest to each photodetector 55. Furthermore, in some embodiments photodetectors 55 may be arranged only in corner zones 50 or edge zones 52, or in other embodiments, only in interior zones 54.

Figure 10:
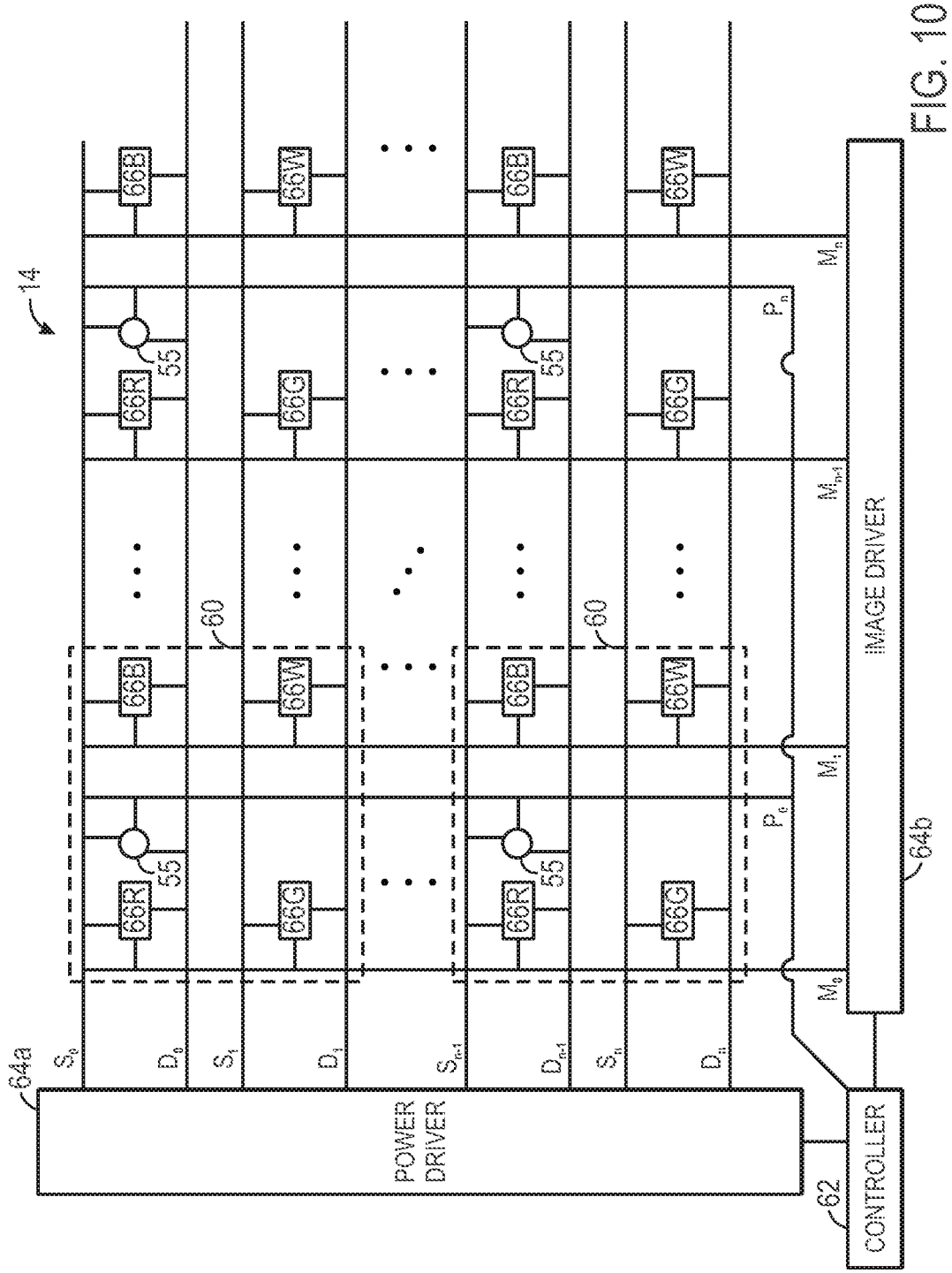
FIG. 10 is a front view of an OLED array arranged in zones with a photodetector disposed in each zone, in accordance with aspects of the present disclosure.

FIG. 10 illustrates a schematic of an OLED array with photodetectors disposed in zones 60 of OLEDs 66. A display 14 may have an array of OLEDs 66, photodetectors 55, a power driver 64a, an image driver 64b, a controller 62, and possibly other components. OLEDs 66 may be arranged in zones 60 such that each zone 60 includes a photodetector 55. As described above, each zone 60 may contain one or more OLEDs 66. In an embodiment as shown in FIG. 10, each zone 60 may include a pixel group containing one red OLED 66R, one green OLED 66G, one blue OLED 66B and one white OLED 66W. In other embodiments, each zone 60 may include a different number or color set of OLEDs 66, and each zone 60 may not be limited to the OLEDs 66 of a single pixel. The OLEDs 66 and drivers 64 of the embodiment shown in FIG. 10 may operate in substantially the same manner as described in FIG. 7. Similarly, the OLED controller 62 may adjust the driving strength of each OLED 66 or zone 60 of OLEDs 66.

Photodetectors 55 are coupled to the OLED controller 62 by way of photodetector lines $P_0$, $P_1$, . . . $P_k$. In some embodiments as shown in FIG. 10, each photodetector 55 may be disposed with a zone 60 of OLEDs 66. Each photodetector 55 measures the light incident to or emitted by its respective zone 60. In some embodiments, the measured light is light emitted by OLEDs 66 within the zone 60 and/or ambient light from external sources. Photodetectors 55 may measure the color and/or brightness of the received light. Each photodetector 55 may transmit signals relating these measurements within the zone 60 to the OLED controller 62.

Each OLED 66 emits light in response to the driving signals supplied by the drivers 64. The color and brightness of the emitted light may depend at least in part on the supplied driving signals and the internal components of the OLED 66. Other light sources may affect the quality of the light emitted by each OLED 66. For example, a bright light incident to a display 14 may greatly diminish the readability of text or graphics shown on the display 14 causing the display image to appear washed out. As another example, in dim light conditions, the OLED display 14 may need to emit light at a reduced brightness for a display image to be readable. Operating an OLED display 14 at a high brightness level at all times may not be desirable for many reasons including power consumption, eye strain, and aging effects on the OLEDs 66.

Other situations may exist where an OLED display 14 is to be used in different colors of ambient light. The color of the ambient light may affect the perceived color of the display 14. For example, a white display image may appear yellow when used in an environment with a yellow tinted ambient light.

Photodetectors 55 disposed throughout the display 14 in zones 60 may detect light incident to each zone 60 of the display 14. Photodetectors 55 may transmit signals relating to the detected light to OLED controller 62 to determine how to counter the effects of the ambient light on the perceived brightness and color of the display 14. The perceivability of a display may depend on the relationship between the properties of light incident on each zone 60 and the emitted brightness and color of each zone 60. For any ambient light conditions, an optimal perceivability setting may exist such that the perceived brightness and color of a zone 60 driven at that setting substantially matches the target brightness and color for that zone 60. The OLED controller 62 may determine the perceivability setting of a zone 60 based on the measured light values and target values for color and brightness of each zone. The OLED controller 62 may adjust the driving strengths of each zone 60 of OLEDs 66 based on the perceived brightness and color of each zone to match an optimal perceivability setting for the zone 60. In an embodiment, driving each zone 60 at its optimal perceivability setting would result in a uniform display appearance.

To optimize the perceivability of each zone 60 for the effects of ambient light. OLED controller 62 may increase the driving strength of affected zones 60 of OLEDs 66, decrease the driving strength of affected zones 60 of OLEDs 66, or increase the driving strength of some affected zones 60 of OLEDs 66 and decrease the driving strength of other less affected zones 60 of OLEDs 66. In some embodiments, the driving strength of each zone 60 may be adjusted according to the ambient light detected in each respective zone 60 to obtain an optimal perceivability setting for each zone 60 of the display 14. For example, zones in a first portion of the display may be in a shadow, zones in a second portion of the display may be in bright light, and zones in a third portion of the display may be in a typical level of ambient light. Based on the detected levels of ambient light for each zone, the OLED controller 62 may decrease the driving strength of the zones in the first portion, increase the driving strength of the zones in the second portion, and not adjust the driving strength of the zones in the third portion.

OLED controller 62 may govern operation of the driver 64 using information stored in memory 28. For example, memory 28 may store values defining the target brightness and/or color of each OLED 66, as well as calibration curves, tables, algorithms, or the like. The memory 28 may also store values defining driving strength adjustments that may be made to compensate for differences in the perceived brightness or target color. In some embodiments, the OLED controller 62 may dynamically adjust the driving strengths of each zone 60 throughout operation of the display 14 to maintain a uniform display appearance through matching the perceived brightness and color of each zone to the target brightness and color for each zone. In some embodiments, OLEDs 66 may not be adjusted to compensate for differences between targeted and perceived color and brightness if the adjustment would not be perceivable.

Figure 11:
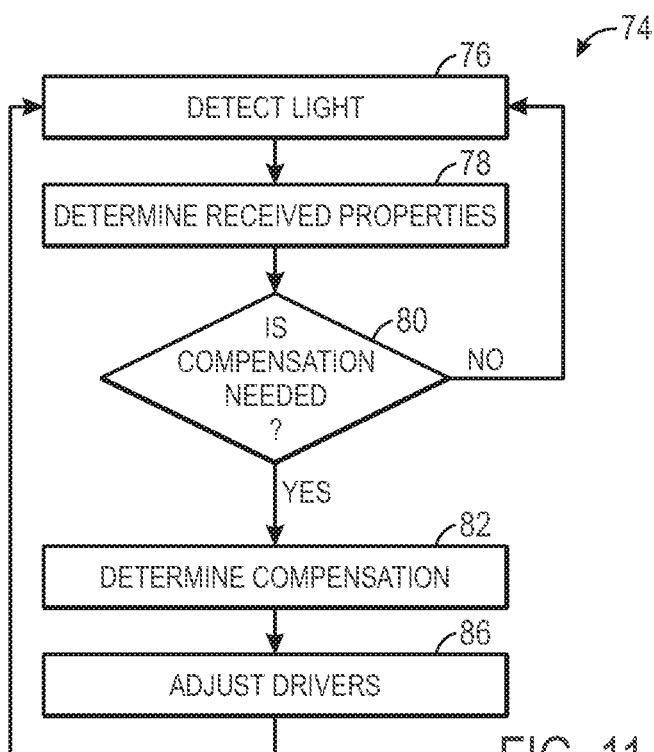
FIG. 11 is a flowchart depicting a method for operating an OLED display to compensate for ambient light, in accordance with aspects of the present disclosure.

FIG. 11 depicts a flowchart of a method 74 for employing photodetectors to adjust OLEDs 66 or zones 60 of a display to compensate for differences in targeted and perceived brightness and/or color of emitted light. The perception of emitted light from a display may depend on ambient light incident to the display 14. The ambient light compensation method 76 may begin by detecting (block 76) light incident to the display 14. In some embodiments, each photodetector 55 is disposed with an OLED 66 as described above. In other embodiments, each photodetector 55 is disposed in the display 14 with a group of OLEDs 66 in a zone 60. A controller 62 receives signals related to the detected light across the display 14 from each photodetector 55. The controller 62 then determines (block 78) the perceived properties of the light emitted from each zone 60 based on the detected light. The controller 62 then determines (node

80) whether compensation is desirable for each OLED 66 or zone 60. This determination may be based on whether a difference between the perceived and targeted color and brightness values for each zone 60 exists. Compensation may not be desirable if the adjustment required would be imperceptible to end users or if the end user has disabled such adjustments, etc. In such circumstances where compensation is not desirable, the OLED controller 62 continues to monitor the signal from photodetectors 55 to determine when adjustments would be desirable for each zone 60.

If compensation for an OLED 66 or zone 60 is desired, the OLED controller 62 then determines (block 82) the compensation for each OLED 66 so that the perceived emitted light substantially matches the targeted light for each OLED 66 or zone 60. The compensation may be determined by considering numerous factors, including OLED specific factors like the measured emitted light properties, present drive strength, previous adjustments, recorded operating hours, and/or information stored in memory 28 like calibration curves, algorithms, and charts. Changes in brightness and/or color for each OLED 66 or zone 60 may improve the image quality of a display. The determined compensation may be in the form of adjustments to the driving instructions of each OLED 66 or zone 60.

In some embodiments, the OLED controller 62 may determine a separate driving strength adjustment for each zone 60 based on the determined perceived light characteristics due to ambient light on each zone 60 to obtain an optimal perceivability setting for each zone. In other embodiments, the OLED controller 62 may determine a driving strength adjustment for each zone 60 based on the perceived light emitted from adjacent zones 60. For example, the OLED controller 62 may increase the brightness of zones 60 in bright light to substantially match the perceived brightness of adjacent zones 60 in dim light. Alternatively, the OLED controller 62 may decrease the brightness of zones 60 in dim light to substantially match the perceived brightness of zones 60 in bright light. In other embodiments, the OLED controller 62 may determine driving strength adjustments for each zone 60 to obtain an optimal perceivability setting for the entire display 14. The OLED controller 62 may employ AM, PWM, or other suitable techniques to vary the driving strength.

As discussed above, compensation adjustments to the driving strength of OLEDs 66 in each zone 60 based on detected ambient light may be based on different factors. Adjustments may be made by the OLED controller 62 based on operating time and comparison with compensation information 70 stored in memory 28, the signal from photodetectors 55, and combinations thereof. For example, the OLED controller 62 may drive the OLEDs 66 in each zone according to calibration curves and algorithms stored in memory 28 and may make fine tuning adjustments based on a signal from each photodetector 55. Once the new driving strengths have been determined, OLED controller 62 may transmit (block 86) the adjustment instructions to the drivers 64.

In some embodiments, photodetectors 55 may be utilized as proximity sensors. Photodetectors 55 utilized as proximity sensors may include photodiodes and photocells. Proximity sensors may detect nearby objects through observing changes in an ambient electromagnetic field or signal (e.g., infrared or visible light). Alternatively, proximity sensors may detect changes in an emitted electromagnetic field or signal.

Figure 12:
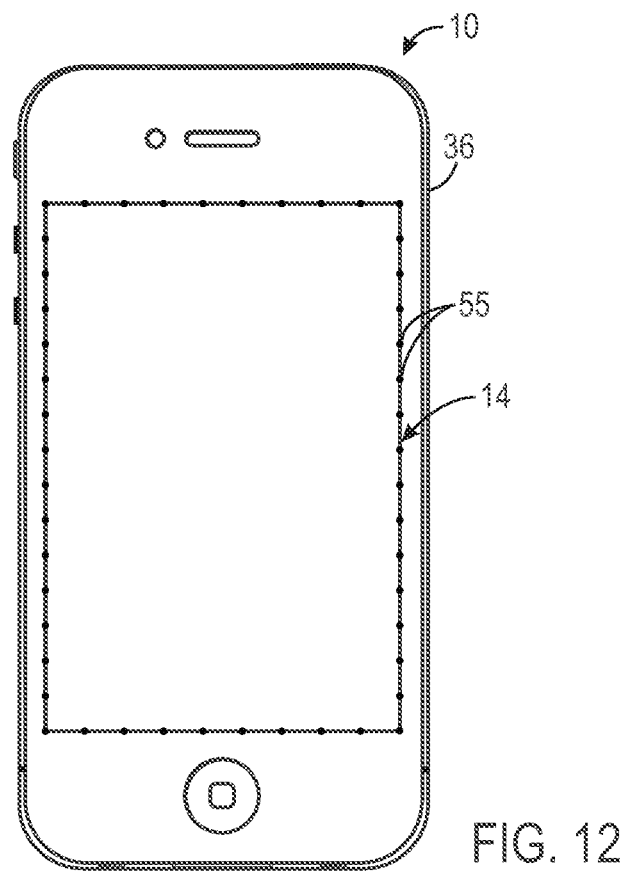
FIG. 12 is a front view of photodetectors disposed on the periphery of the display of a handheld device, in accordance with aspects of the present disclosure.

Photodetectors 55 disposed in the display 14 to be utilized as proximity sensors may be disposed with each OLED 66 as shown in FIG. 7, disposed with zones 60 of OLEDs 66 as shown in FIG. 10, or disposed on the periphery of the display 14 as shown in FIG. 12. As described above, each photodetector 55 is coupled to the OLED controller 62. When a photodetector 55 senses a nearby object, the photodetector 55 may transmit information in the form of an electrical signal to the OLED controller 62.

Photodetectors 55 disposed in the display 14 and utilized as proximity sensors may provide a number of functionalities to an electronic device 10. In some embodiments, photodetectors 55 may be used to turn a display 14 or portion of a display 14 on or off in a variety of situations, including when a laptop display is closed, a cellular phone is placed by an ear, a handheld device is placed in a pocket, or a portion of a display is covered. For example, if a portion of the display 14 is covered and fully obscured from view, the OLED controller 62 may determine that the OLEDs 66 in the covered zones should be turned off and only the OLEDs 66 in unobscured zones of the display should remain on. The unobscured zones of the display may show a shrunken version of the original display image or a modified image suitable for the smaller unobscured area.

In another embodiment, proximity sensors incorporated in a display may add touch screen functionality. For example, multiple photodetectors 55 may be utilized to predict the location at which an approaching object (e.g., a finger) may touch the display. In an embodiment, multiple photodetectors 55 may be used to discern approaching objects such that an entire cell phone display 14 is turned off when placed next to a user's ear, but the display 14 remains turned on when touched by a user's finger.

Figure 13:
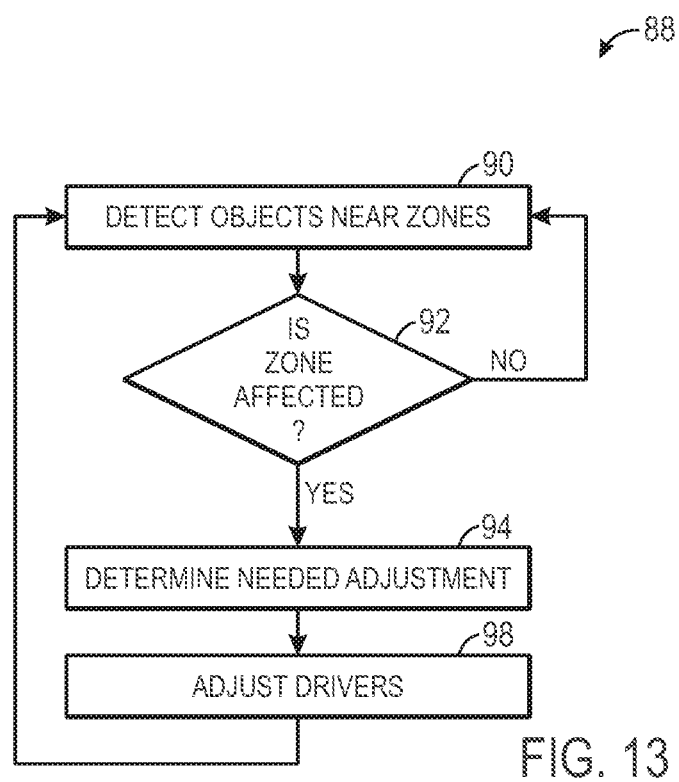
FIG. 13 is a flowchart depicting a method for operating an OLED display to detect objects near the display and alter the display in response, in accordance with aspects of the present disclosure.

FIG. 13 depicts a flowchart of a method 88 for employing photodetectors as proximity sensors and making appropriate alterations to the display based on sensed nearby objects. The method 88 may begin by detecting (block 90) objects near each zone. Each photodetector 55 to be utilized as proximity sensors may be disposed with each OLED 66, zones 60 of OLEDs 66, or larger portions of the display 14. Each photodetector 55 is also coupled to an OLED controller 62. Photodetectors 55 may transmit information corresponding to detected nearby objects to the OLED controller 62. The transmitted information may be in the form of electrical signals representing changes in the amount of light received by a photodetector 55 or distance from the photodetector 55 to the object that OLED controller 62.

Based on the signals transmitted by each photodetector 55, the OLED controller 62 determines (node 92) whether all or portions of the display 14 need to be adjusted. This determination may be based on many factors, including the distance to the detected object and to the size, direction, and identity of the detected object. For example, a finger approaching the display 14 may require an adjustment to at least a portion of the display due to the finger's distance and identity; however, a hand passing over the display 14 may not require an adjustment due to the hand's distance and direction. As another example, the controller may determine the difference in transmitted photodetector signals between operating the display 14 in a dark room and placing the display 14 into a pocket so that the display remains on in a dark room but turns off in a pocket. In such circumstances where adjustment is not needed, the OLED controller 62 continues to monitor the signal from photodetectors 55 to determine when adjustments would be needed to parts of the display 14.

If adjustment for all or pan of the display 14 is needed, the OLED controller 62 then determines (block 94) the adjustment needed for each OLED 66 of the display 14. The adjustment needed may be determined by considering numerous factors, including current use of the electronic device 10, ambient light, what portions of the display detect the object(s), and information stored in memory 28. The determined compensation may be in the form of adjustments to the driving signal or scan signal of each OLED 66 or zone 60. Once the new driving strengths have been determined, OLED controller 62 may transmit (block 98) the adjustment instructions to the drivers 64.

While many of the embodiments illustrated and described mention photodetectors disposed with OLEDs or zones of OLEDs, it should be further understood that photodetectors disposed in the display with any number of OLEDs may be utilized in any method herein described. Furthermore, it is intended that the photodetectors may be used for aging compensation, ambient light compensation, proximity sensing, and combinations thereof as illustrated in FIGS. 8, 11, and 13.

The specific embodiments described above have been shown byway of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A display, comprising:
   an array of pixels including at least first and second pixels;
   a layer of glass overlapping the array of pixels;
   an ambient light sensor that is overlapped by the array of pixels, wherein array of pixels includes thin film transistors that are interposed between the layer of glass and the ambient light sensor; and
   a controller that adjusts a strength of blue display light emitted from the array of pixels based at least partly on signals generated by the ambient light sensor.

2. The display defined in claim 1 further comprising a proximity sensor located within the array of pixels.

3. The display defined in claim 2 wherein the proximity sensor generates proximity sensor signals in response to external objects in proximity to the display.

4. The display defined in claim 1 wherein the pixels comprise organic light-emitting diode pixels.

5. The display defined in claim 1 further comprising a substrate on which the array of pixels is located.

6. The display defined in claim 5 wherein the ambient light sensor is located on the substrate.

7. The display defined in claim 5 wherein the ambient light sensor is located on an additional substrate that is separate from the substrate.

8. The display defined in claim 1 further comprising an infrared light sensor located within the array of pixels.

9. The display defined in claim 1 wherein the controller controls a brightness of the array of pixels based at least partly on the signals from the ambient light sensor.

10. The display defined in claim 1 wherein the ambient light sensor is configured to detect visible light.

11. A display having a display white point, comprising:
    an array of pixels including at least first and second pixels;
    a protective glass layer overlapping the array of pixels;
    a substrate on which the array of pixels is located;
    a visible light sensor located behind the array of pixels, wherein the array of pixels includes thin film transistors that are interposed between the protective glass layer and the visible light sensor; and control circuitry that controls the display white point based at least partly on signals from the visible light sensor by adjusting a driving strength of blue pixels in the display.

12. The display defined in claim 11 wherein the control circuitry controls a brightness of the array of pixels based at least partly on the signals from the visible light sensor.

13. The display defined in claim 11 further comprising a proximity sensor located within the array of pixels configured to detect external objects in proximity to the display.

14. The display defined in claim 11 wherein the visible light sensor comprises an ambient light sensor for detecting ambient light.

15. The display defined in claim 11 wherein the visible light sensor detects light emitted by the array of pixels.

16. A display, comprising:
an array of organic light-emitting diodes;
a glass layer overlapping the array of organic light-emitting diodes;
a substrate on which the array of organic light-emitting diodes is located;
a light sensor located behind the array of organic light-emitting diodes that detects a color of ambient light, wherein the array of organic light-emitting diodes includes thin film transistors that are interposed between the glass layer and the light sensor; and
control circuitry that controls a strength of blue display light emitted from the array of organic light-emitting diodes based at least partly on the color of the ambient light.

17. The display defined in claim 16 wherein the array of organic light-emitting diodes includes first and second organic light-emitting diodes and wherein the light sensor is located between the first and second organic light-emitting diodes.

18. The display defined in claim 17 wherein the light sensor is located on the substrate.

19. The display defined in claim 16 further comprising a proximity sensor located within the array of organic light-emitting diodes configured to detect external objects in proximity to the display.

* * * * *

UNITED STATES PATENT AND TRADEMARK OFFICE
CERTIFICATE OF CORRECTION

Page 1 of 1

PATENT NO. : 12,400,588 B2
APPLICATION NO. : 16/909519
DATED : August 26, 2025
INVENTOR(S) : Stephen Brian Lynch et al.

It is certified that error appears in the above-identified patent and that said Letters Patent is hereby corrected as shown below:

In the Claims

Column 16, Line 33, "wherein array" should read -- wherein the array --

Signed and Sealed this
Seventh Day of October, 2025

John A. Squires
*Director of the United States Patent and Trademark Office*